(12) United States Patent
Sciarretta

(10) Patent No.: US 10,543,773 B2
(45) Date of Patent: Jan. 28, 2020

(54) CARGO CONTROL CINCH STRAP SYSTEM

(71) Applicant: Snap-Loc Cargo Control Systems, LLC, Las Vegas, NV (US)

(72) Inventor: Jeff Sciarretta, Las Vegas, NV (US)

(73) Assignee: Snap-Loc Cargo Control Systems, LLC, Las Vegas, NV (US)

( * ) Notice: Subject to any disclaimer, the term of this patent is extended or adjusted under 35 U.S.C. 154(b) by 0 days.

(21) Appl. No.: 15/897,473

(22) Filed: Feb. 15, 2018

(65) Prior Publication Data

US 2018/0236925 A1  Aug. 23, 2018

Related U.S. Application Data

(62) Division of application No. 15/174,212, filed on Jun. 6, 2016, now Pat. No. 9,914,387.

(60) Provisional application No. 62/171,839, filed on Jun. 5, 2015.

(51) Int. Cl.
*B60P 7/00* (2006.01)
*B60P 7/08* (2006.01)
*B62B 1/14* (2006.01)

(52) U.S. Cl.
CPC ............. *B60P 7/0823* (2013.01); *B62B 1/14* (2013.01); *B62B 2203/44* (2013.01)

(58) Field of Classification Search
CPC . B60P 7/0823; B62B 1/06; B62B 1/14; B62B 2203/44
USPC .. 410/10–12, 20, 21, 23, 50, 51, 96, 97, 99, 410/100, 117, 118; 24/298, 300–302, 24/265 AL
See application file for complete search history.

(56) References Cited

U.S. PATENT DOCUMENTS

| | | | | |
|---|---|---|---|---|
| 2,623,760 | A * | 12/1952 | Fornelius | ................... B62B 1/14 410/97 |
| 8,496,417 | B1 * | 7/2013 | Yang | ........................ B60P 7/083 410/51 |
| 9,914,387 | B2 * | 3/2018 | Sciarretta | ............... B60P 7/0823 |
| 2008/0148533 | A1 * | 6/2008 | Calkin | ....................... A41F 9/02 24/302 |

* cited by examiner

*Primary Examiner* — Stephen T Gordon
(74) *Attorney, Agent, or Firm* — Avyno Law P.C.

(57) ABSTRACT

A cinch strap system for securing cargo to a dolly or other type of hand truck having a first and second strap. The first strap has opposing first and second loop ends. A first loop is on the first loop end of the first strap and secures at least two rings to the first strap. A second loop is on the second loop end of the first strap. The second strap is of longer length than the first strap and includes a second strap loop on one end of the second strap. The end of the second strap opposing the second strap loop is a free end.

5 Claims, 8 Drawing Sheets

CARGO CONTROL CINCH STRAP SYSTEM

CROSS-REFERENCE TO RELATED APPLICATIONS

This application is a divisional and claims priority to U.S. patent application Ser. No. 15/174,212 filed on Jun. 6, 2016 titled CARGO CONTROL CINCH STRAP SYSTEM, which claims priority to U.S. Provisional Patent Application Ser. No. 62/171,839, filed Jun. 5, 2015, titled CARGO CONTROL CINCH STRAP SYSTEM, both applications of which are incorporated by reference into this application in their entirety.

FIELD OF THE INVENTION

The present invention relates generally to a cargo control cinch strap system and, more particularly, to a cargo control cinch strap system for use with a dolly or hand truck.

BACKGROUND OF THE INVENTION

Cargo that is improperly secured can shift and fall, frequently causing accidents which are sometimes severe. Improperly secured cargo can also be the cause of loss or damage to the cargo itself, loss or damage to property, or cause environmental hazards. Thus, a need still exists for permitting safe and secure handling of cargo under a variety of conditions and, in particular, when carrying and transporting cargo on a dolly or hand truck.

SUMMARY OF THE INVENTION

The invention relates to a cinch strap system that is adapted to secure single or multiple items of cargo to a dolly or hand truck for transportation. The cinch strap system comprises two separate straps (a first strap and a second strap) that engage one another to secure cargo loaded onto a dolly or hand truck to form a cargo control system. The first strap in the system is shorter than the second strap. The first strap comprises two overlap loops at opposing ends. At one end is a smaller loop end securing two rings. At the opposing end is a longer loop end. The second strap is a much longer strap to allow the strap to wrap around the dolly and the cargo, as needed. The second strap also includes a loop at one end of the strap. The other end of the strap is free for attachment to the rings on the first strap.

The first strap is secured around the top of the handle of the dolly or hand truck by passing the rings on the strap through the long loop end of the strap and tightening the strap around the handle, leaving the rings available to engage the free end of the second strap. The second strap is similarly secured around a lower strut of the dolly or hand truck by passing the free end through the second strap looped end and tightened. The cargo to be secured is then loaded onto the dolly or hand truck. The free end of the second strap is then passed underneath the cargo shelf, then up and around the cargo following the load line. It is then secured by cinching through the two rings on the first strap.

Other devices, apparatus, systems, methods, features and advantages of the invention are or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention.

DETAILED DESCRIPTION

Figure 1:
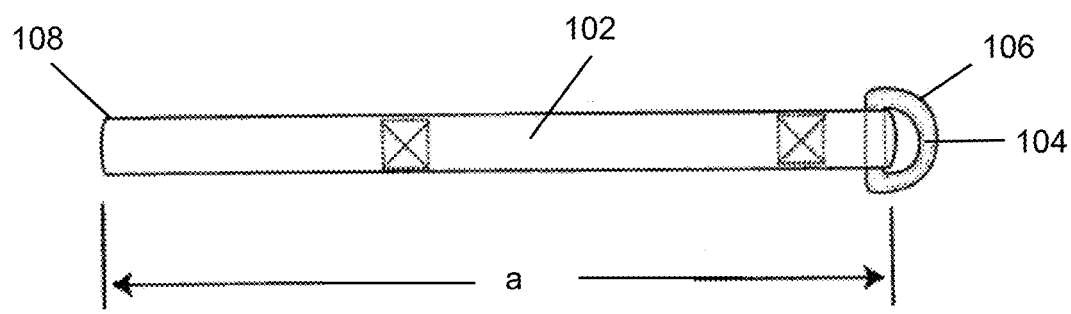
FIG. 1 illustrates a top view of a first strap of the cinch strap of the present invention.

As illustrated in FIGS. 1-11, the invention relates to a cinch strap system 100 that is adapted to enable the secure carriage of single or multiple items of cargo 126 on a dolly or hand truck 120. The cinch strap system comprises a first strap 102 and a second strap 110 that engage one another to secure cargo 126 loaded onto a dolly or hand truck 120. The engagement of the first and second straps 102 and 110 enable the secure transport of single or multiple items of cargo 126 on a dolly or hand truck 120. These straps 102, 110 may be made of polyester webbing, nylon or any other suitable material known in the art for general use with tie-down or ratchet straps.

Figure 2:
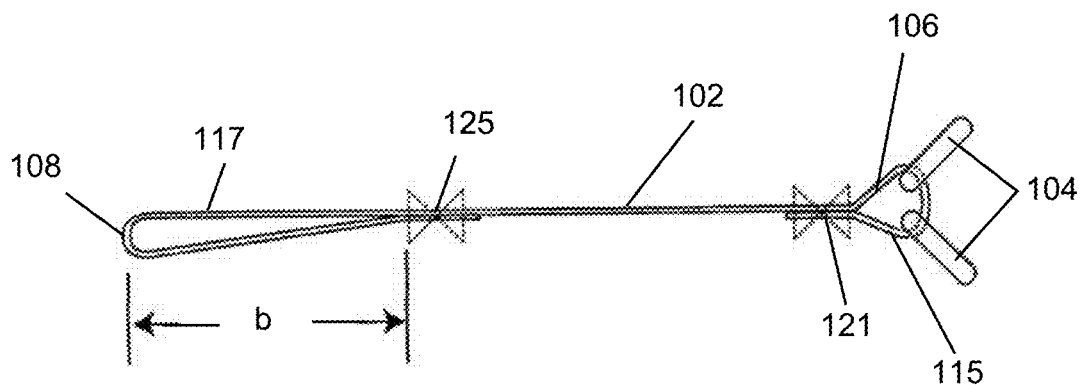
FIG. 2 illustrates a side view of the first strap of FIG. 1.
Figure 3:
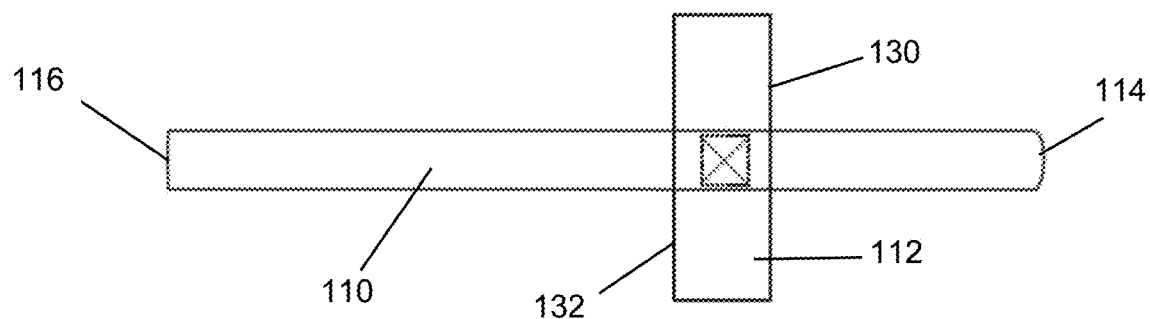
FIG. 3 illustrates a top view of a second strap of the cinch strap of the present invention.
Figure 4:
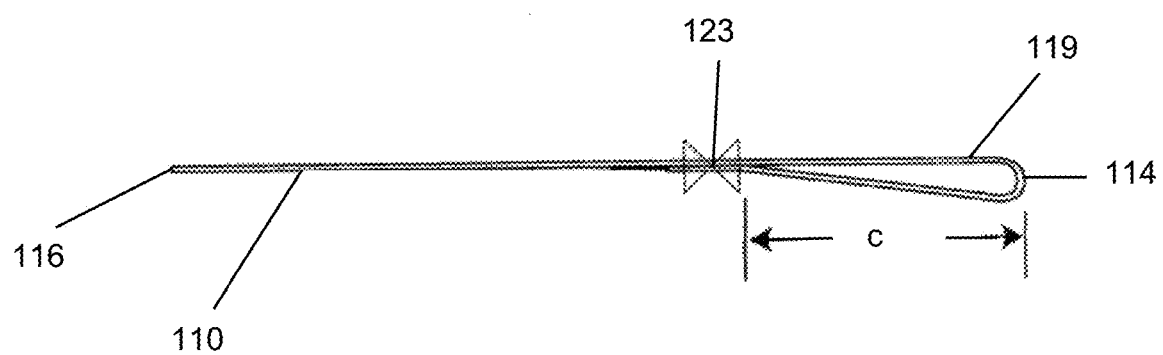
FIG. 4 illustrates a top view of the second strap of FIG. 3.

FIGS. 1-4 illustrate one example of a cinch strap system 100 of the present invention, which, as noted above, includes a first and second strap 102, 110. FIGS. 1 & 2 illustrate an example of a first strap 102 and FIGS. 3 & 4 illustrate an example of a second strap 110.

In particular, FIG. 1 illustrates a top view of one example of a first strap 102 of the cargo cinch strap system 100 of the present invention, and FIG. 2 illustrates a side view of the strap of FIG. 1. As shown in FIGS. 1 & 2, the first strap 102 comprises two opposing loop ends 106, 108. The loops 115, 117 at each loop end 106, 108 may be created by overlapping the end material and sewing the free ends to the strap 102, as illustrated in FIG. 2 at 121.

A short loop 115 is created at one loop end 106 (i.e., the short loop end 106). The short loop end 106 includes two rings 104 (such as D-rings). In the present invention, the two rings 104 have a minimum thickness of ¼ inch per ring and are made of zinc. Those skilled in the art will, however, recognize that metals other than zinc, plastics or other materials may be used for the rings 104 and other sized rings may 104 be used without departing from the scope of the invention.

At the strap end 108 opposing the short loop end 106 (i.e., the long loop end 108), a large loop 117 is created. Again, the large loop 117 at the long loop end 108 is created by overlapping the end material of the strap and sewing the free ends to the strap 102, as illustrated in FIG. 2 at 125.

In one example, the larger loop 117 may measure approximate six inches from end to stitch (distance b in FIG. 2). The short loop 115 is generally only a few inches, or as needed to maintain the rings 104. With the loop ends 106, 108 sewn, the first strap 102 may have an overall length of twelve inches (distance a in FIG. 1). Those skilled in the art will recognize that the size of the first cargo cinch strap 102 may vary based upon intended use. For example, larger and/or thicker straps may be made for use with larger dollies or larger cargo.

FIG. 3 illustrates a top view of one example of a second strap 110 of the cargo cinch strap system 100 of the present invention, and FIG. 4 illustrates a side view of the strap of FIG. 3. As shown in FIGS. 3 & 4, the second strap 110 comprises two opposing ends 114, 116. The second strap has a loop 119 (i.e., the second strap loop 114) at one end (i.e., second strap loop end 114) and the opposing end is a free end 116. The second strap loop 119 may be created by overlapping the end material and sewing the free end to the strap 102, as illustrated in FIG. 4 at 123.

In the present invention, the first strap 102 is shorter than the second strap 110. The second strap 110 is a much longer than the first strap 102 to provide more strap to secure cargo, as needed. The longer second strap 110 allows the second strap to wrap from the back, around the underside of the dolly or hand truck 120 (FIGS. 7 & 8) and over the cargo 126 to secure to the first strap 102. In this example, the second strap 110 has an overall length of one-hundred thirty-two inches with an overlap loop 119 at one end 114. Shorter or longer first and second straps 102, 110 may be provided for various applications.

For storage of the second strap 110 when not in use, a strip 112 may be sewn near the second strap loop end 114, perpendicular to the strap 110. The free ends of the strip 112 may be attached to one another using Velcro®. In this example, the strip 112 may be two inches wide and may include a Velcro® loop side 130 and Velcro® hook side 132 of the strip 112. The Velcro® loop side 130 and Velcro® hook side 132 of the strip 112 may be the same distance (e.g., 7.5 inches) and the total strip 112 may be, for example, eleven inches in overall strip length. In this example, the strip 112 may be stitched between the strap 110 and the free end of the strap used to create the second strap loop 119. The strip 112 may also be sewed at other points along the strap 110 near the second strap loop end 114.

On the strip 112, when viewed from the top view (FIG. 3), the loop ends of the Velcro® (not shown) may be on the underside of loop side 130 of the strip 112 and the hook ends of the Velcro® (not shown) may be on the top side of the hook side 132 of the strip 112. The second strap loop 119 on the second strap loop end 114 may be an approximately six-inch overlap loop (distance c on FIG. 4). The other end 116 of the strap 110 is free for attachment to the rings 104 on the first strap 102. While the present invention is taught using Velcro® to secure the ends of the strip 112, those skilled in the art will recognize that other securing mechanisms may be used to secure the opposing ends of the strip 112, including but not limited to straps, buttons or buckles, to name a few.

Figure 5:
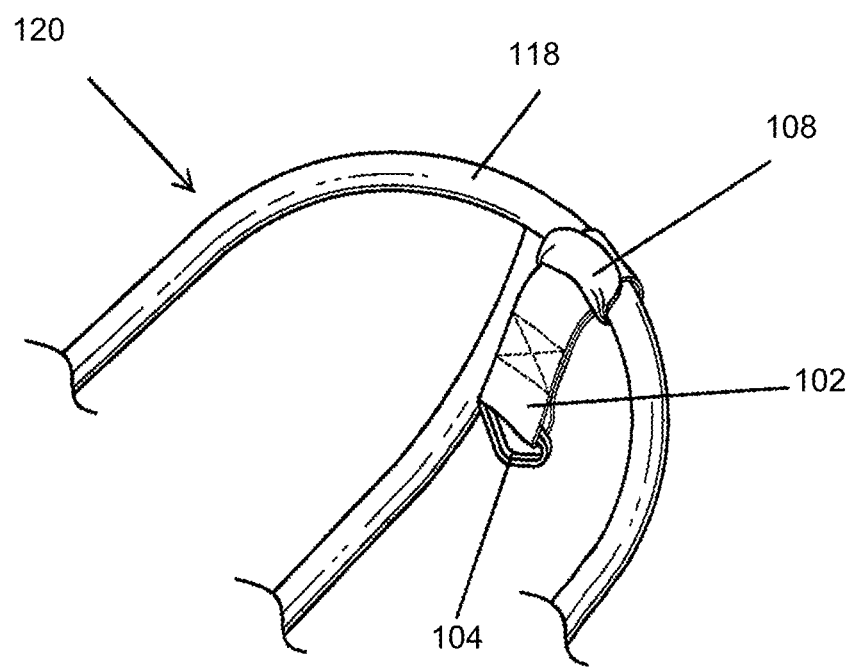
FIG. 5 illustrates the first strap of FIG. 1 cinched around the top of the handle of a dolly or hand truck.

FIGS. 5-9 illustrate how the first and second straps 102, 110 are used to secure and transport cargo 126 on a dolly or hand truck 120. FIG. 5 illustrates the securing of the first strap 102 to the top of the handle 118 of the dolly or hand truck 120, with the handle between the first and second ends 106, 108 of the strap 102. The rings 104 at the short loop end 106 of the strap 102 are passed through the large loop 117 at the long loop end 108 of the strap 102, such that the strap 102 encircles the handle 118. The ends of the strap 102 are then pulled tight around the handle 118, securing the first strap 102 to the handle 118 at the long loop end 108, leaving the short loop end 106 with the rings 104 available to engage the free end 116 of the second strap 114.

Figure 6:
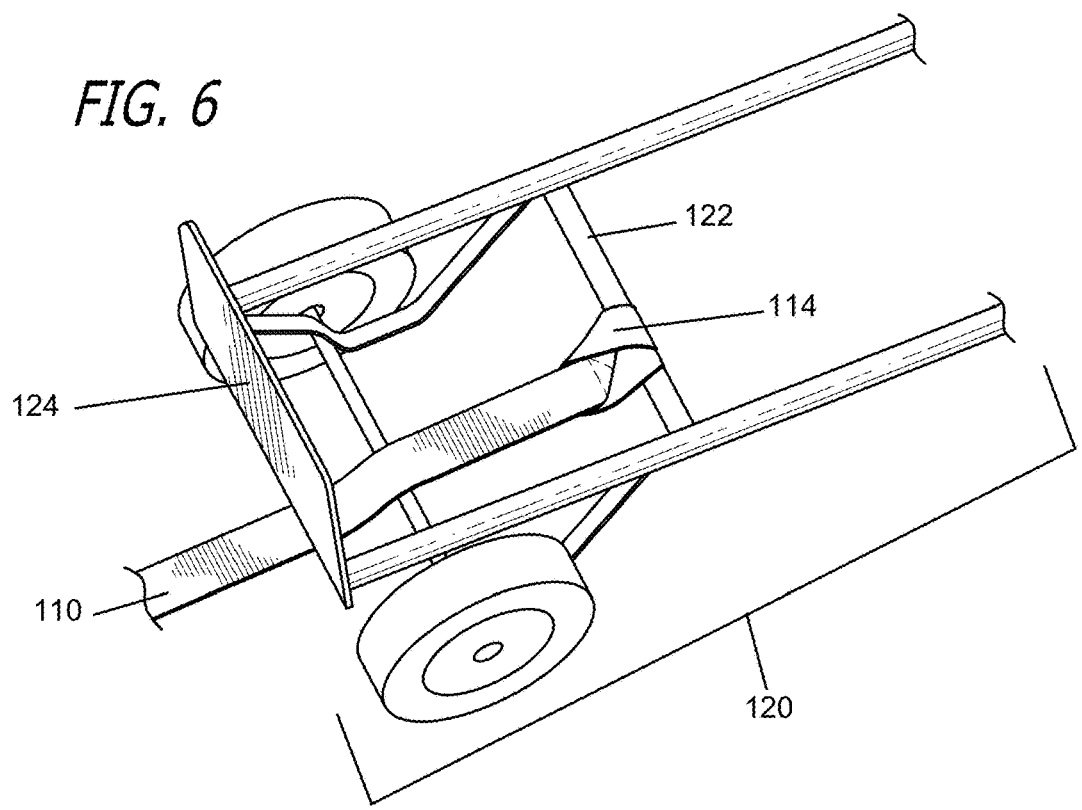
FIG. 6 illustrates the second strap of FIG. 3 secured to a cross-strut of a dolly or hand truck.
Figure 7:
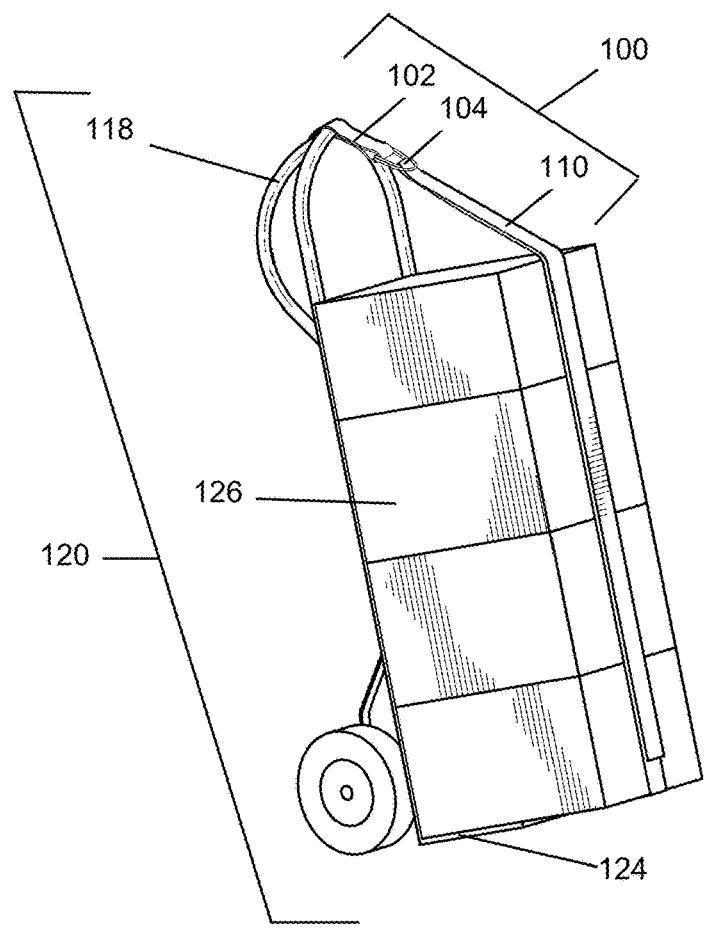
FIG. 7 illustrates the cargo strap of the present invention securing cargo to a dolly or hand truck.

As illustrated by FIG. 6, the second strap 110 is similarly cinched around a lower cross strut 122 of the dolly or hand truck 120 by laying it over the strut, then passing the free end 116 through the second strap loop 119 on the second strap looped end 114 and cinching it tightly around the strut 122. As illustrated in FIG. 7, the cargo 126 to be secured is then loaded onto the dolly or hand truck 120. The free end 116 of the second strap 110 is then passed underneath the cargo shelf 124 of the dolly or hand truck 120, then up and around the cargo 126 following the load line. The free end 116 of the second strap 110 is then secured by cinching through the two rings 104 on the first strap 102. FIG. 7 illustrates the cargo strap system 100 secured to a dolly or hand truck 120 and securing the cargo 126 resting on the cargo shelf 124 of the dolly or hand truck 120 against the dolly or hand truck 120.

Figure 8:
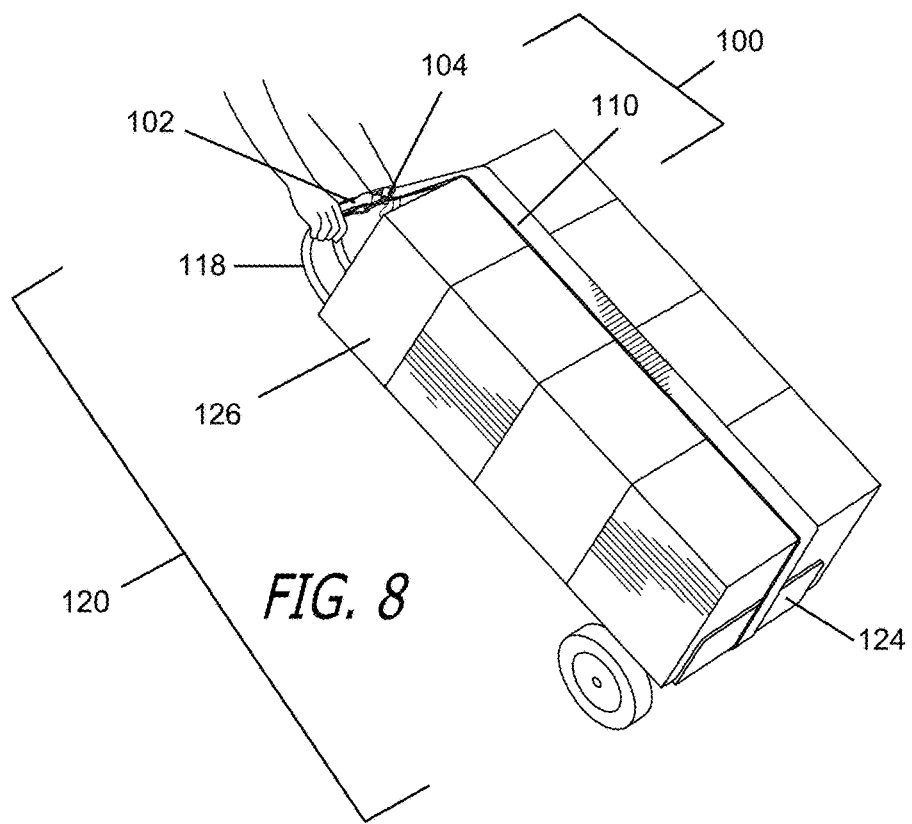
FIG. 8 illustrates the cargo strap as used in operation to secure and transport multiple items of cargo on the dolly or hand truck.

FIG. 8 illustrates the cargo strap system 100 as used in operation to secure multiple items of cargo 126 onto the dolly or hand truck 120. As shown, when the operator of the dolly or hand truck 120 grasps the handle and tilts the dolly or hand truck 120 to allow movement of the cargo 126, the cargo control cinch strap system 100 of the present invention secures the cargo 126 in place and prevents slippage of the cargo on the dolly or hand truck 120.

Figure 9:
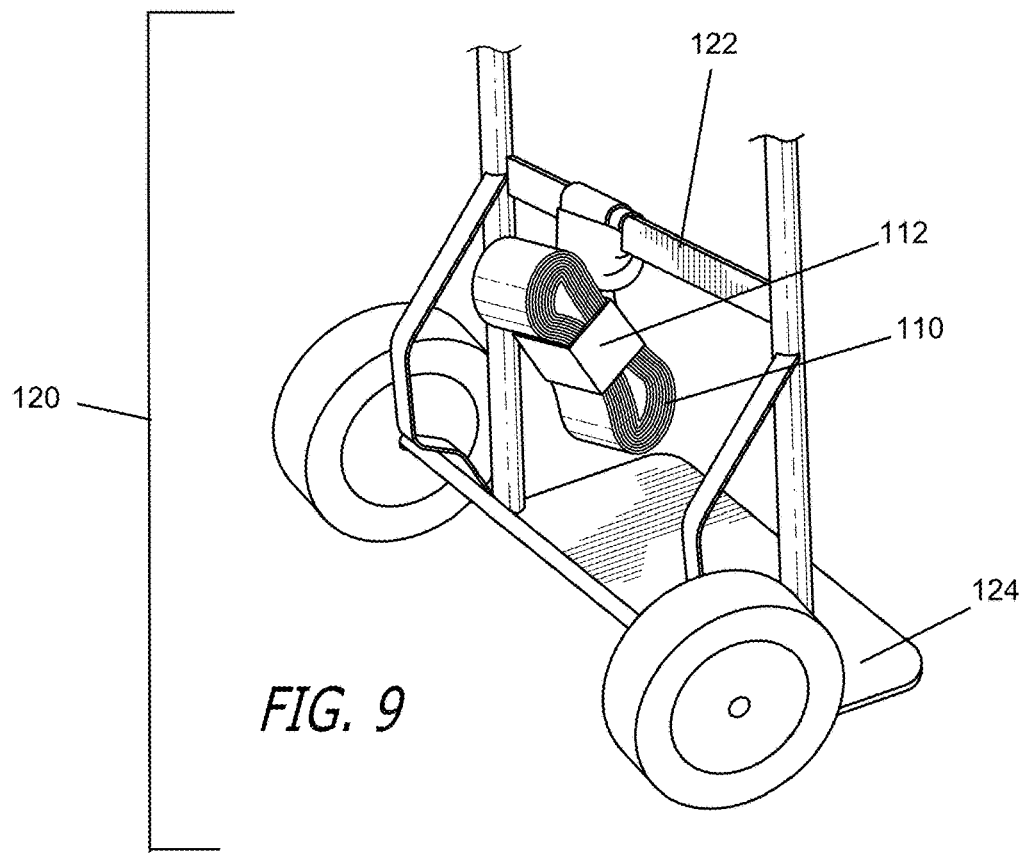
FIG. 9 illustrates the second strap of the cargo strap of the present invention cinched around a cross-strut of the dolly in a stored position when not in use.

FIG. 9 illustrates how the second strap 110 of the cargo control cinch strap system 100 may be secured and stored when not in use. The first strap 102 (i.e., the short strap) may be disengaged from the second strap 110 (i.e., the long strap). The second strap 110 may be coiled together. The rolled coil is then secured using the Velcro® strip 112 on the second strap by wrapping the strip 112 around the coil strip 112 and attaching the Velcro® loop side 130 and Velcro® hook side 132 of the strip 112.

Figure 10:
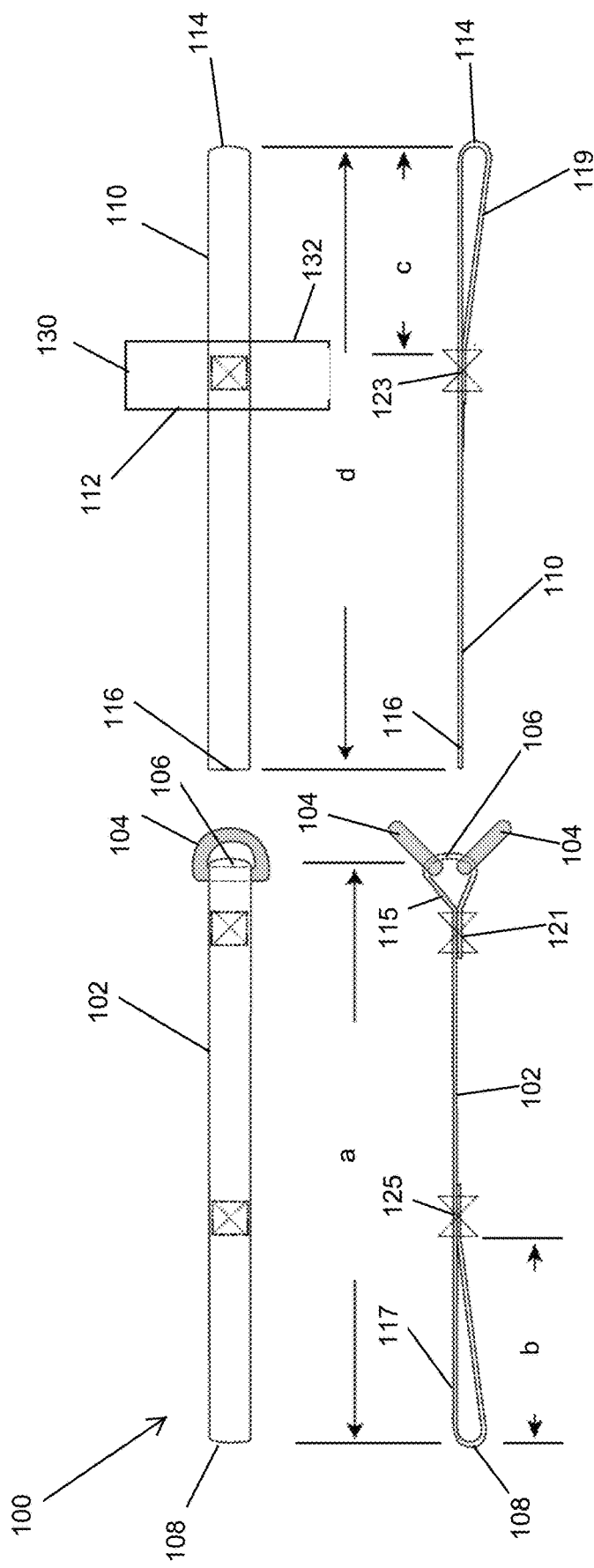
FIG. 10 illustrates an example of a cinch strap system of the present invention.

FIG. 10 illustrates an example of a cinch strap system 100 of the invention. FIG. 10 illustrates a side-by-side view of the top of the both the first and second strap 102, 110 with a side view of each strap 102, 110 positioned below. As discussed above, the first strap 102 comprises two opposing loops ends 106, 108, having loop 115 at the short loop end 106 and larger loop 117 at the long loop end 108. The short loop end 106 includes two rings 104.

Figure 11:
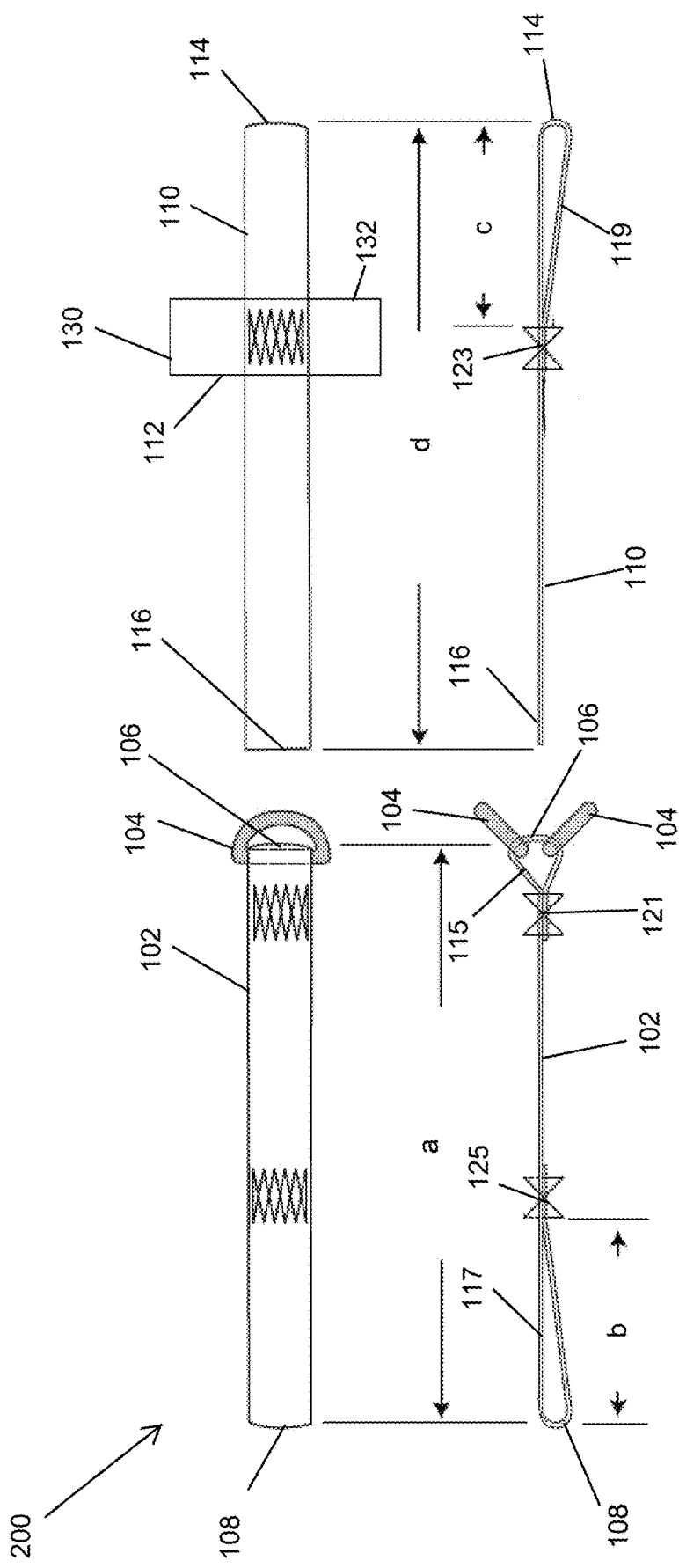
FIG. 11 illustrates another example of a thicker cinch strap system of the present invention.

In the illustrated example, the straps 102, 110 may be designed to be approximately one inch wide. The larger loops 117 and 119 may measure approximate six inches from end to stitch (distance b and c in FIG. 10). With the loop ends 106, 108 sewn, the first strap 102 may have an overall length of twelve inches (distance a in FIG. 1) and the second strap may have an overall length of approximately one-hundred thirty-two inches, or approximately 10-12 times the length of the first strap. Those skilled in the art will recognize that the size of the first cargo cinch strap 102 may vary based upon intended use. For example, as illustrated in FIG. 11, larger and/or thicker straps may be made for use with larger dollies 120 or larger cargo 126. FIG. 11 illustrates another example of a thicker cinch strap system 200 of the present invention. All the parts and sizes of the cinch strap system 200 remain the same as those illustrated in FIG. 10 except that the straps 102, 110 are wider than the straps 102, 110 (e.g., two-inch straps).

The present invention further includes a method for securing cargo to a dolly or hand truck 120, the method includes securing a first strap 102 to the top of the handle 118 of the dolly or hand truck 120, with the handle between the first and second ends 106, 108 of the strap 102. The first strap 102 may be secured passing the two rings 104 at the short loop end 106 of the strap 102 through the large loop 117 at the long loop end 108 of the strap 102, such that the strap 102 encircles the handle 118. The ends of the strap 102 are then pulled tight around the handle 118, securing the first strap 102 to the handle 118 at the long loop end 108, leaving the short loop end 106 with the rings 104 available to engage the free end 116 of the second strap 114.

The second strap 110 is similarly cinched around a lower cross strut 122 of the dolly or hand truck 120 by laying it over the strut, then passing the free end 116 through the second strap loop 119 on the second strap looped end 114 and cinching it tightly around the strut 122. The cargo 126 to be secured is then loaded onto the dolly or hand truck 120. The free end 116 of the second strap 110 is then passed underneath the cargo shelf 124 of the dolly or hand truck 120, then up and around the cargo 126 following the load line. The free end 116 of the second strap 110 is then secured by cinching through the two rings 104 on the first strap 102.

Figure 12:
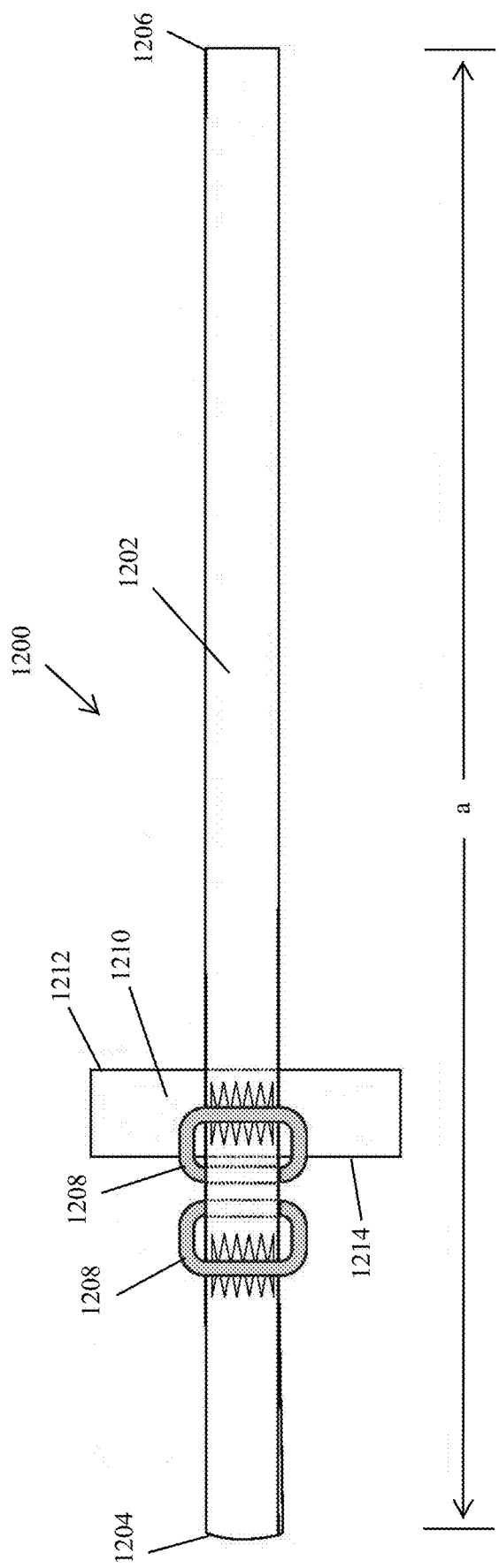
FIG. 12 illustrates a top view of a single cinch strap in accordance with the present invention.
Figure 13:
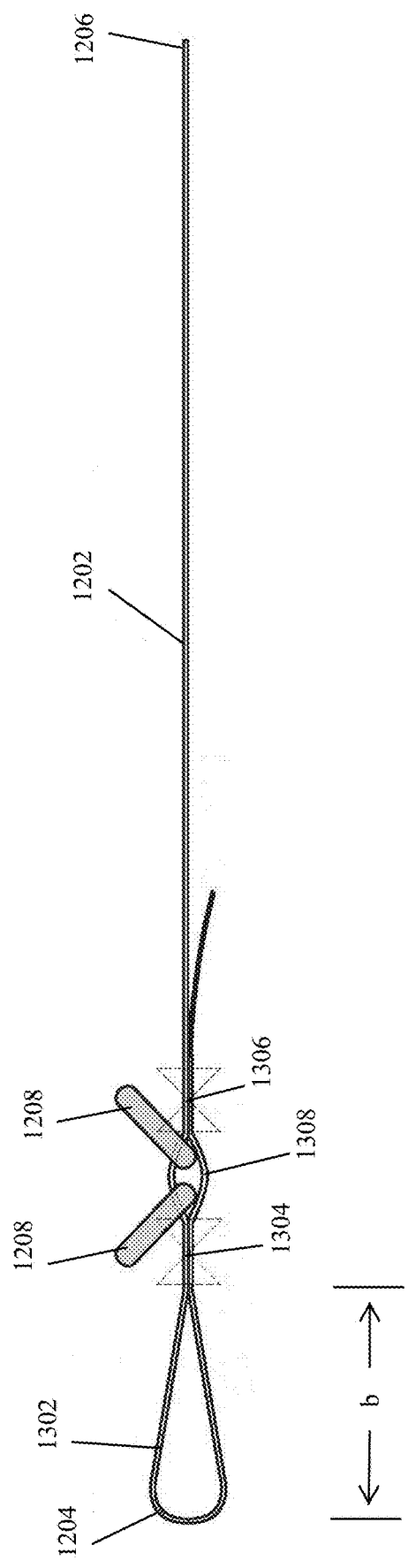
FIG. 13 illustrates a side view of the single cinch strap of FIG. 12.

FIGS. 12 and 13 relates to another example of a cinch strap system 1200 that is adapted to enable the secure carriage of single or multiple items of cargo 126 on a dolly or hand truck 120. The cinch strap system comprises of a single cinch strap 1202 that engages with itself to secure cargo 126 loaded onto a dolly or hand truck 120. The single cinch strap 1202 may be made of polyester webbing.

In particular, FIG. 12 illustrates a top view of the single cinch strap 1202 of the present invention, and FIG. 13 illustrates a side view of the single cinch strap of FIG. 12. As shown in FIGS. 12 and 13, the strap 1202 comprises two opposing ends 1204, 1206 where end 1204 is a loop end having a loop 1302 and end 1206 is a free end. Loop 1302 may be created by overlapping the end material and sewing the free end to the strap 1202 at a first sewn location 1304, as illustrated in FIG. 13.

The single cinch strap 1202 may also have a middle loop 1308 located near the loop end 1204 of the strap 1202. The middle loop 1308 may be created by overlapping the end material and sewing the free end to the strap 1202 at a first sewn location 1304 and at a second sewn location 1306, as illustrated in FIG. 13, thereby creating a loop between the first sewn location 1304 and second sewn location 1306. The middle loop may include two rings 1208 (such as D-rings). The two rings 1208 may have a minimum thickness of ¼ inch per ring and are made of zinc.

The loop 1204 may measure approximately eight inches from the loop end 1204 to the first sewn location 1304 (distance b in FIG. 13). With the loop end 1204 sewn, the strap 1202 may have an overall length of 180 inches or 15 feet (distance a in FIG. 12). Those skilled in the art will recognize that the size of the single cinch strap 1202 may vary based upon intended use.

A strip 1210 may be sewn near the loop end 1204, perpendicular to the strap 1202. The strip 1210 may be two inches wide and may include a Velcro® loop side 1212 and Velcro® hook side 1214 of the strip 1210. The Velcro® loop side 1212 and Velcro® hook side 1214 of the strip 1210 may be the same distance (e.g., 7 inches) and the total strip 1210 may be, for example, ten inches in overall strip length. In this example, the strip 1210 may be stitched between the strap 1202 and the free end of the strap used to create middle loop 1308 (i.e. the second sewn location 1306). On the strip 1210, when viewed from the top view (FIG. 12), the loops of the Velcro® (not shown) may be on the underside of loop side 1212 of the strip 1210 and the hooks of the Velcro® (not shown) may be on the top side of the hook side 1214 of the strip 1210.

The foregoing description of an implementation has been presented for purposes of illustration and description. It is not exhaustive and does not limit the claimed inventions to the precise form disclosed. Modifications and variations of various kinds are possible, including length, width and compositional material, in light of the above description or may be acquired from practicing the invention. The claims and their equivalents define the scope of the invention.

What is claimed is:

1. A cinch strap system for securing cargo to a dolly or other type of hand truck, the cinch strap system comprising:
    a single cinch strap having a first end and a second end, whereby the first end is a loop end having a loop, whereby the loop on the loop end is created by sewing a free end of the strap to the strap at a first sewn location, whereby the free end of the strap is also sewn to the strap at a second sewn location, where a middle loop is created between the first sewn location and second sewn location, and where at least two rings are securely attached to the middle loop.

2. The cinch strap system of claim 1 where the loop on the loop end of the strap is larger than the middle loop.

3. The cinch strap system of claim 1 where the strap includes a strip secured perpendicular to the strap, the strip having two free strip ends.

4. The cinch strap system of claim 3 where the strip is secured to the strap at the second sewn location.

5. The cinch strap system of claim 1 where the at least two rings are D-rings.

* * * * *